(12) United States Patent
Hovden et al.

(10) Patent No.: US 7,884,807 B2
(45) Date of Patent: Feb. 8, 2011

(54) PROXIMITY SENSOR AND METHOD FOR INDICATING A DISPLAY ORIENTATION CHANGE

(75) Inventors: Torbjorn Hovden, Santa Clara, CA (US); Mark Andrew Huie, Sunnyvale, CA (US); Thuy Thanh Bich Le, Santa Clara, CA (US); Phillip Frank Acker, Jr., San Mateo, CA (US)

(73) Assignee: Synaptics Incorporated, Santa Clara, CA (US)

( * ) Notice: Subject to any disclaimer, the term of this patent is extended or adjusted under 35 U.S.C. 154(b) by 893 days.

(21) Appl. No.: 11/748,881

(22) Filed: May 15, 2007

(65) Prior Publication Data

US 2008/0284738 A1 Nov. 20, 2008

(51) Int. Cl.
*G06F 3/041* (2006.01)
(52) U.S. Cl. .................. 345/173; 178/18.01; 345/158
(58) Field of Classification Search ......... 345/156–178; 178/18.01–18.09, 18.11
See application file for complete search history.

(56) References Cited

U.S. PATENT DOCUMENTS

| | | | |
|---|---|---|---|
| 4,566,001 A | 1/1986 | Moore et al. | |
| 5,335,557 A | 8/1994 | Yasutake | |
| 5,598,527 A | 1/1997 | Debrus et al. | |
| 5,859,629 A | 1/1999 | Tognazzini | |
| 5,942,733 A | 8/1999 | Allen et al. | |
| 6,043,809 A | 3/2000 | Holehan | |
| 6,639,584 B1 | 10/2003 | Li | |
| 6,707,449 B2 | 3/2004 | Hinckley et al. | |
| 7,002,557 B2 | 2/2006 | Iizuka et al. | |
| 7,088,343 B2 | 8/2006 | Smith et al. | |
| 2006/0026536 A1 | 2/2006 | Hotelling et al. | |
| 2006/0238517 A1 | 10/2006 | King et al. | |

*Primary Examiner*—Stephen G Sherman
(74) *Attorney, Agent, or Firm*—Ingrassia Fisher & Lorenz, P.C.

(57) ABSTRACT

A proximity sensor device and method is provided that facilitates orientation changes in displays. The proximity sensor device and method provide a user with the ability to indicate an orientation change in a display using the sensing region of a proximity sensor device as a user interface. In one specific embodiment, proximity sensor device is implemented to indicate an orientation change in a first way responsive to detected object motion along the sensing region in a first direction, and is further implemented to indicate an orientation change in a second way responsive to detected object motion along the sensing region in a second direction. Thus, a user can cause orientation changes of different ways through the use of object motions in different directions along the sensing region.

20 Claims, 9 Drawing Sheets

PROXIMITY SENSOR AND METHOD FOR INDICATING A DISPLAY ORIENTATION CHANGE

FIELD OF THE INVENTION

This invention generally relates to electronic devices, and more specifically relates to proximity sensor devices and using a proximity sensor device for producing orientation changes on display screens of electronic devices.

BACKGROUND OF THE INVENTION

Proximity sensor devices (also commonly called touch pads or touch sensor devices) are widely used in a variety of electronic systems. A proximity sensor device typically includes a 2D or 3D sensing region, often demarked by a 2D surface, which uses capacitive, resistive, inductive, optical, acoustic and/or other technology to determine the presence, location and/or motion of one or more fingers, styli, and/or other objects. The proximity sensor device, together with one or more finger(s) and/or other objects, can be used to provide an input to the electronic system. For example, proximity sensor devices are used as input devices for larger computing systems, such as those found integral within notebook computers or peripheral to desktop computers, as well as those found in kiosks and other terminal. Proximity sensor devices are also used in smaller systems, including: handheld system such as personal digital assistants (PDAs), remote controls, communication systems such as wireless telephones and text messaging systems. Increasingly, proximity sensor devices are used in media systems, such as cameras, CD/DVD/MP3 recorders or players, video recorders or players, gaming machines, or other media recorders or players.

Many electronic devices include a display screen used to display information to the user. For example, displays are typically found in computing systems, such as desktop computers, notebook computers, tablet computers or peripheral to computers. Display screens are also included in smaller systems, such as handheld systems such as personal digital assistants (PDAs), remote controls, communication systems such as wireless telephones and text messaging systems. Likewise, display screens are commonly used in media systems, such as CD, DVD, MP3, video, gaming or other media recorders or players.

In these applications the display screen can be used to display a wide variety of information to the user. For example, a typical display screen can be used to display graphical and/or textual elements to the user. For example, the display screen can be used to display a graphical user interface (GUI) of a computing device. In such a device the interface may include elements such as windows, icons, menu bars, scroll bars, navigation elements, etc. The display screen can also be used to display media to the user, such as showing pictures, playing videos, or providing gaming images.

One issue with a display screen is the orientation of the displayed information in the display screen. In many devices it is desirable to facilitate user selected orientation changes in the display. For example, in a tablet computer a user may wish the display to be oriented in a "vertical" or "portrait" configuration when being used to view a text document, but may desire a "horizontal" or "landscape" configuration when being used to view a spreadsheet. As another example, in a photo device a user may wish the display to be oriented in a "vertical" or "portrait" configuration in some cases and "horizontal" or "landscape" configuration in others, depending on the picture viewed. In other cases it may be desirable to allow a user to "flip" the orientation 180 degrees, such as for a tablet computer or handheld device placed on a table, as to allow other viewers on the other side of the table to see the display in the correct orientation for them. In all these cases, it is desirable to facilitate user control of the orientation changes in the display. Thus, there is a continuing need for improved techniques for facilitating orientation changes in electronic devices.

BRIEF SUMMARY OF THE INVENTION

The present invention provides a proximity sensor device and method that facilitates orientation changes for displays. The proximity sensor device and method provide a user with the ability to indicate an orientation change for a display using the sensing region of a proximity sensor device as a user interface. In one specific embodiment, a proximity sensor device is implemented to indicate an orientation change in a first way responsive to detected object motion along the sensing region in a first direction, and is further implemented to indicate an orientation change in a second way responsive to detected object motion along the sensing region in a second direction. Thus, a user can cause orientation changes of different ways through the use of object motions in different directions along the sensing region. This provides increased usability and flexibility, and allows a user to easily cause a variety of different orientation changes without requiring multiple buttons, steps or gestures by the user.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary of the following detailed description.

The embodiments of the present invention provide a proximity sensor device and method that facilitates orientation changes in displays. The proximity sensor device and method provide a user with the ability to indicate an orientation change in a display using the sensing region of a proximity sensor device as a user interface. In one specific embodiment, proximity sensor device is implemented to indicate an orientation change in a first way (e.g., clockwise) responsive to detected object motion along the sensing region in a first direction, and is further implemented to indicate an orientation change in a second way (e.g., counter-clockwise) responsive to detected object motion along the sensing region in a second direction. Thus, a user can cause different ways of orientation changes through the use of different directions of object motion along the sensing region. This provides increased usability and flexibility, and allows a user to easily cause different orientation changes without requiring the implementation of multiple buttons, steps or gestures by the user.

Figure 1:
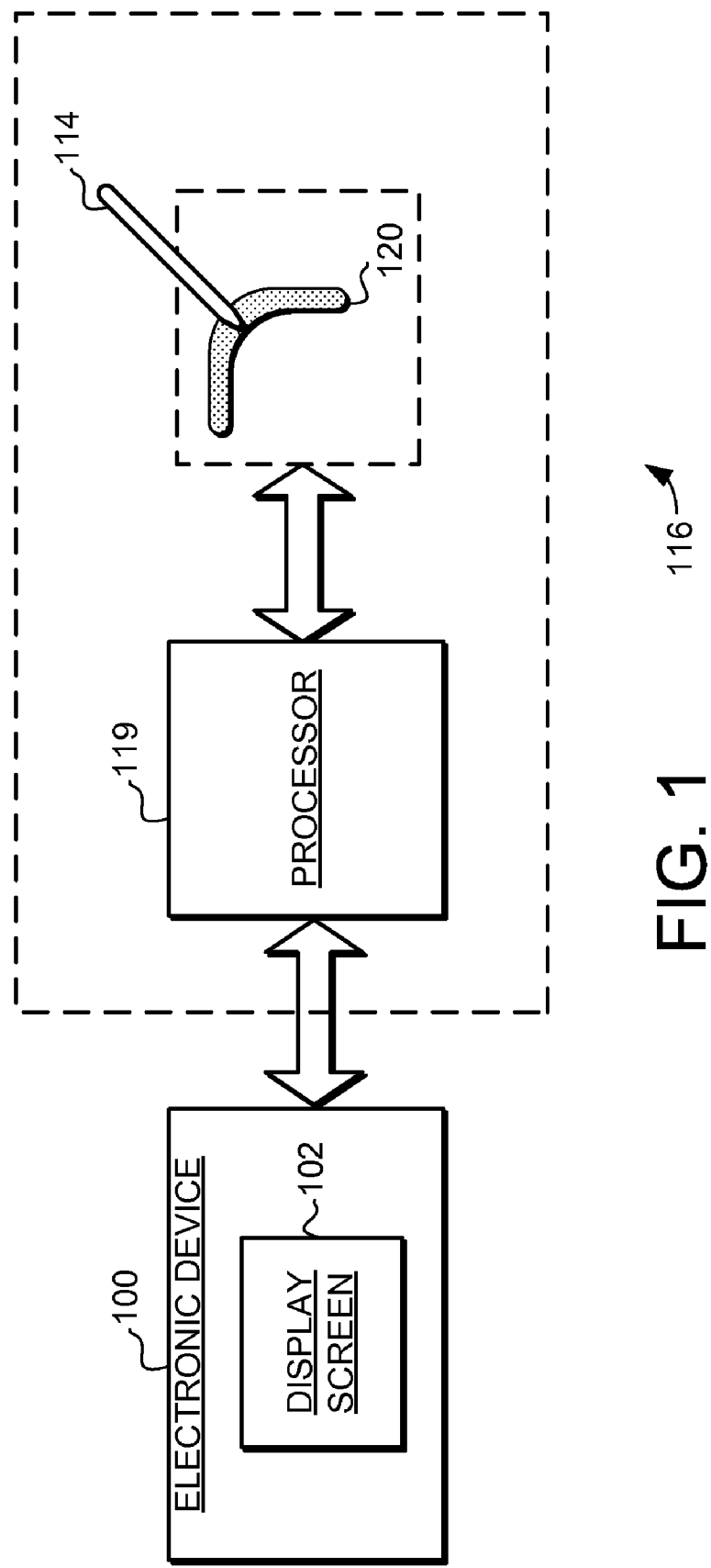
FIG. 1 is a block diagram of an exemplary system that includes a proximity sensor device in accordance with an embodiment of the invention.

Turning now to the drawings figures, FIG. 1 is a block diagram of an exemplary electronic device 100 that is coupled to a proximity sensor device 116. As will be discussed in further detail below, electronic device 100 includes a display screen 102, and is meant to represent any type of personal computer, portable computer (laptop or tablet), workstation, personal digital assistant, gaming device, communication device (including wireless phones and messaging devices), media device, including recorders and players (including televisions, cable boxes, music players, and vide players) or other device capable of accepting input from a user and displaying on the display screen 102. Accordingly, the various embodiments of electronic device 100 may include any type of processor, memory or display. Additionally, the elements of electronic device 100 may communicate via a bus, network or other wired or wireless interconnection. For examples the electronic device 100 can be connected to the proximity sensor device 116 through any type of interface or connection, including I2C, SPI, PS/2, Universal Serial Bus (USB), Bluetooth, RF, IRDA, or any other type of wired or wireless connection to list several non-limiting examples.

Proximity sensor device 116 includes a processor 119 and a sensing region 120. Proximity sensor device 116 is sensitive to the position of one or more input objects, such as a stylus 114, finger and/or other input object within the sensing region 120. "Sensing region" 120 as used herein is intended to broadly encompass any space above, around, in and/or near the proximity sensor device 116 wherein the proximity sensor is able to detect a position or motion of the object. In a conventional embodiment, sensing region 120 extends from the surface of the sensor in one or more directions for a distance into space until signal-to-noise ratios prevent object detection. This distance may be on the order of less than a millimeter, millimeters, centimeters, or more, and may vary significantly with the type of position sensing technology used and the accuracy desired. Accordingly, the planarity, size, shape and exact locations or the particular sensing region 120 will vary widely from embodiment to embodiment.

In operation, proximity sensor device 116 suitably detects positional information of stylus 114, finger or other input object(s) within sensing region 120, and using processor 119, provides electrical or electronic indicia of the position to the electronic device 100. The electronic device 100 appropriately processes the indicia to accept inputs from the user to cause an orientation change on a display to occur, as will be discussed in greater detail below.

The proximity sensor device 116 can use a variety of techniques for detecting the presence of an object. As several non-limiting examples, the proximity sensor device 116 can use capacitive, resistive, inductive, surface acoustic wave, or optical techniques. In a common capacitive implementation of a touch sensor device a voltage is typically applied to create an electric field across a sensing surface. A capacitive proximity sensor device 116 would then detect the position of an object by detecting capacitance (e.g., changes in capacitance or absolute capacitance) that result from the location of the object. Likewise, in a common resistive implementation a flexible top layer and a bottom layer are separated by insulating elements, and a voltage gradient is created across the layers. Pressing the flexible top layer creates electrical contact between the top layer and bottom layer. The resistive proximity sensor device 116 would then detect the position of the object by detecting the voltage output due to the relative resistances between driving electrodes at the point of contact of the object. In an inductive implementation, the sensor might pick up loop currents induced by a resonating coil or pair or coils, and use some combination of the magnitude, phase and/or frequency to determine distance, orientation or position. In all of these cases the proximity sensor device 116 detects the presence of the object and delivers positional information to the system 100. Examples of the type of technologies that can be used to implement the various embodiments of the invention can be found at U.S. Pat. Nos. 5,543,591, 6,259,234 and 5,815,091, each assigned to Synaptics Inc.

Proximity sensor device 116 includes a sensor (not shown) that utilizes any combination of solid-state sensing technology to implement one or more sensing regions 120. "Solid-state sensing technology" is used here to indicate those sensing technologies that do not require substantial movement of the sensing elements in operation, and include implementations using capacitive, resistive, inductive, acoustic, magnetic, or optical technologies. Solid-state sensing technologies are advantageous to ones requiring mechanical structures that move substantially (e.g. mechanical switches and sliders), which often require more space to implement, and which more easily wear out over time. For example, the sensor of proximity sensor device 116 can use arrays of capacitive sensor electrodes to support any number of sensing regions 120. As another example, the sensor can use capacitive sensing technology in combination with resistive sensing technology to support the same sensing region 120 or different sensing regions 120. Depending on sensing technique used for detecting object motion, the size and shape of the sensing region 120, the desired performance, the expected operating conditions, and the like, proximity sensor device 116 can be implemented in a variety of different ways. The sensing technology can also vary in the type of information provided, such as to provide "zero-dimensional" 1-bit positional information (e.g. presence near the sensor or not, object interaction sufficient to cause sensor signal past a threshold or not), "one-dimensional" positional information (e.g. along a sensing region) as a scalar, "two-dimensional" positional information (e.g. horizontal/vertical axes, angular/radical axes, or any other combination of axes that span the two dimensions) as a combination of values, and the like.

The processor 119, sometimes referred to as a proximity sensor processor or touch sensor controller, is couple to the sensor and the electronic device 100. In general, the processor 119 received electrical signals from the sensor, processes the electrical signals, and communicates with the electronic device 100. The processor 119 can perform a variety of processes on the signal received from the sensor to implement the proximity sensor device 116. For example, the processor 119 can select or connect individual sensor electrodes, detect presence/proximity, calculate position or motion information, and report a position or motion when a threshold is reached, and/or interpret and wait for a valid tap/stroke/character/button/gesture sequence before reporting it to the electronic device 100, or indicating it to the user. The processor 119 can also determine when certain types or combinations of object motions occur proximate the sensor. For example, the processor 119 can distinguish between motion in a first direction along sensing region 120 and motion in a second direction along the sensing region 120, and can generate a signal to cause an approximate orientation change in display 102 indicated by the motion.

In this specification, the term "processor" is defined to include one or more processing elements that are adapted to perform the recited operations. Thus, the processor 119 can comprise all or part of one or more integrated circuits, firmware code, and/or software code that receive electrical signals from the sensor and communicate with the electronic device 100. In some embodiments, the elements that comprise the processor 119 would be located with the sensor. In other embodiments, some elements of the processor 119 would be with the sensor and other elements of the processor 119 would reside on or near the electronic device 100. In this latter embodiment minimal processing could be performed near the sensor, with the majority of the processing performed on the electronic system 100.

Furthermore, the processor 119 can be physically separate from the part of the electronic device 100 that it communicates with, or the processor 119 can be implemented integrally with that part of the electronic device 100. For example, the processor 119 can reside at least partially on a processor performing other functions for the electronic device 100 system aside from implementing the proximity sensor device 116.

It should be noted that although the various embodiments described herein are referred to as "proximity sensor devices", "touch sensor devices", "proximity sensors", or "touch pads", these terms as used herein are intended to encompass not only conventional proximity sensor devices, but also a broad range of equivalent devices that are capable of detecting the position of a one or more fingers, pointers, styli and/or other objects. Such devices may include, without limitation, touch screens, touch pads, touch tablets, biometric authentication devices, handwriting or character recognition devices, and the like. Similarly, the term "positional information" as used herein is intended to broadly encompass absolute and relative position-type information, and also other types of spatial-domain information such as velocity, acceleration, and the like, including measurement of presence or motion in one or more directions. Various forms of positional information may also include time history components, as in the case of gesture recognition and the like. Accordingly, proximity sensor devices can appropriately detect more than the mere presence or absence of an object an may encompass a broad range of equivalents.

Again, as the term is used in this application, the term "electronic device" broadly refers to any type of device that includes a display 102 and communicates with proximity sensor device 116. Furthermore, the display screen 102 can be physically separate from other portions of electronic device 100 that it communicates with, or the display screen 102 can be implemented integrally with that part of the electronic device 100. The electronic device 100 and its display screen 102 could thus comprise any type of device or devices in which a touch sensor device can be implemented in or coupled to. Furthermore, the proximity sensor device could be implemented as part of the electronic device 100, or coupled to the electronic device using any suitable technique. As non-limiting examples the electronic device 100 could thus comprise any type of computing device, media player, communication device or gaming device. In some cases the electronic device 100 it itself a peripheral to a larger system. For example, the electronic device 100 could be a data input or output device, such as a remote control or display device, that communicates with a computer or media system (e.g., remote control for television) using a suitable wired or wireless technique. It should also be noted that the various elements (display screen, processor, memory, etc.) of the electronic device 100 could be implemented as part of an overall system, as part of the proximity sensor device, or as a combination thereof. Additionally, the electronic device 100 could be a host or a client to the proximity sensor device 116.

It should also be understood that while the embodiments of the invention are to be described here in the context of a fully functioning proximity sensor device, the mechanisms of the present invention are capable of being disturbed as a program product in a variety of forms. For example, the mechanisms of the present invention can be implemented and disturbed as a proximity sensor program on a computer-readable signal bearing media. Additionally, the embodiments of the present invention apply equally regardless of the particular type of computer-readable signal bearing media used to carry out the distribution. Examples of signal bearing media include: recordable media such as memory sticks/cards/modules, and optical and magnetic disks.

Figure 2:
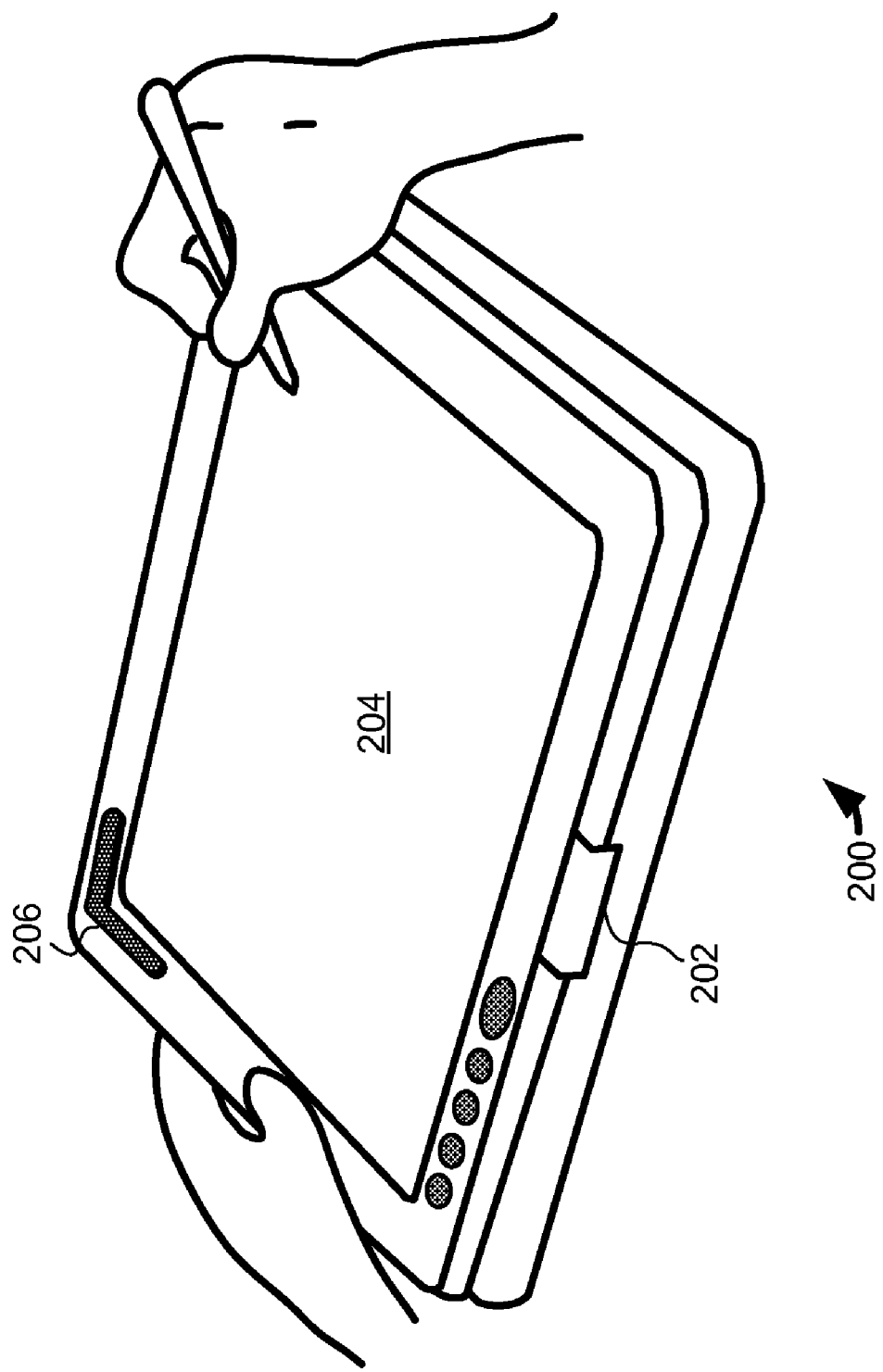
FIG. 2 is a perspective view of a computing device that includes a proximity sensor device in accordance with embodiments of the invention.

Turning now to FIG. 2, an exemplary portable computer 200 is illustrated. The portable computer 200 is an example of the type of electronic device in which a proximity sensor device for initiating orientation changes in a display can be implemented. In the illustrated embodiment, the portable computer 200 is a convertible device, i.e., on that can be operated both as a traditional "notebook" computer and as "tablet" computer. When operated as a traditional notebook computer a keyboard (not shown in this FIG.) is the primary means of data entry. A rotating hinge 202 allows the display screen 204 to rotate around and fold down on top of the keyboard, with the display screen 204 visible and covering the keyboard, as shown in FIG. 2. In this configuration, the portable computer 200 operates as a tablet computer with the display screen 204 providing the primary means of data entry. Specifically, in this type of embodiment the display screen 204 is also a proximity sensor device that allows a user to interface with the computer using a stylus, fingertip or other object instead of or in addition to the traditional keyboard. For example, the portable computer 200 can use the display screen 204 and handwriting recognition to provide a user interface to the computer 200. Additionally, various icons and controls on the display screen can be manipulated and activated using the stylus and/or other object.

In accordance with the embodiments of the invention, the portable computer 200 also includes a proximity sensor device adapted to detect object motion proximate a sensing region 206 and adapted to facilitate orientation changes on the display screen 204. It should be noted that portable computer 200 is again just one example, and that other types of electronic devices can be implemented with the proximity sensor device. For example, other types of table computers that do not include dedicated keyboards, typically referred to as "slate" computers, can also be implemented with the proximity sensor device.

In the embodiment illustrated in FIG. 2, the sensing region 206 of the proximity sensor extends from a plane parallel to the front face of computing device 200, along with the display 204. This allows the user to view the display 204 while also viewing the sensing region 206, even while the orientation of the display 204 is changed with the proximity sensor device. In one specific implementation, a normal vector to the display 204 and a normal vector to the touch surface associated with the sensing region 206 would be substantially parallel. However, it is not required that display 204 and the plane from which the sensing region 206 extends be coplanar or be parallel to each other. For example, the touch surface can be located on a beveled housing near the display 204.

Figure 3:
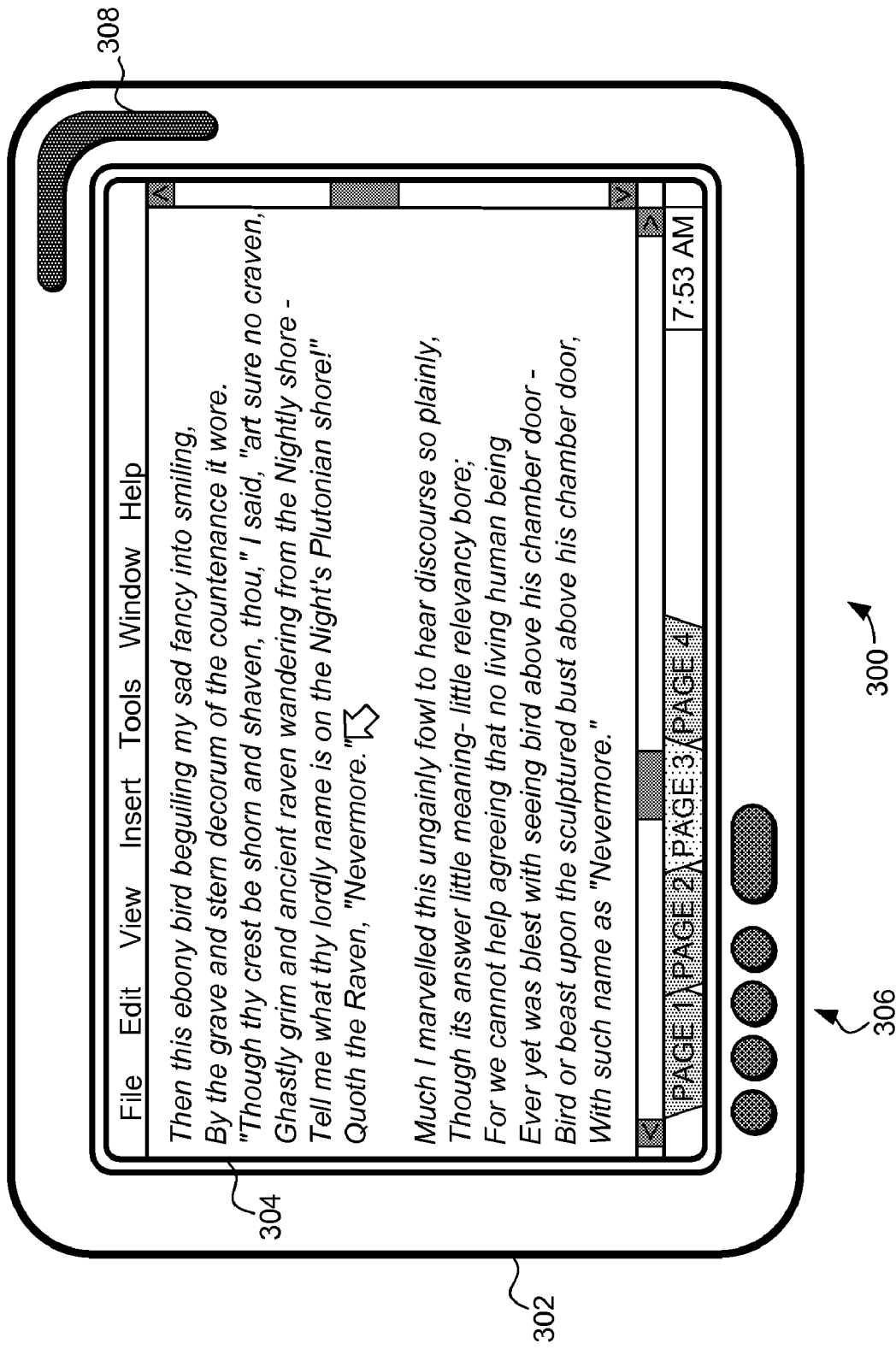
FIGS. 3-4 are top views of a slate computing device that includes a proximity sensor device in accordance with embodiments of the invention.

Turning now to FIG. 3, another embodiment of a computing device with a proximity sensor is illustrated. In this embodiment the electronic device comprises a "slate" computer device 300. The slate computer device 300 includes a case 302, a display screen 304, a plurality of buttons 306 and a proximity sensor device adapted to detect object motion along a sensing region 308. The display screen 304 displays the user interface for the computer device 300. In the embodiment of FIG. 3, the displayed user interface includes a variety of interface elements, including a menu bar, page tabs, scroll bars, a cursor and a clock, as well as a displayed document. It should be noted that this is just one example of a user interface on a display screen, and that many different user interfaces, with different combinations of interface elements and other features can be implemented and their orientation changed with the various embodiments of the invention.

As stated above, the proximity sensor device provides a user of computer device 300 with the ability to make orientation changes in the display screen 304. Specifically, the proximity sensor device is implemented to detect object motion along the sensing region 308 and to cause an orientation change in response to the detected motion. In one specific embodiment, the proximity sensor device is implemented to indicate an orientation change in a first way responsive to detected object motion along the sensing region 308 in a first direction, and is further implemented to indicate an orientation change in a second way responsive to detected object motion along the sensing region 308 in a second direction Thus, a user of computer device 300 can cause orientation changes in different ways through the use of object motions of different directions along the sensing region 308

Figure 4:
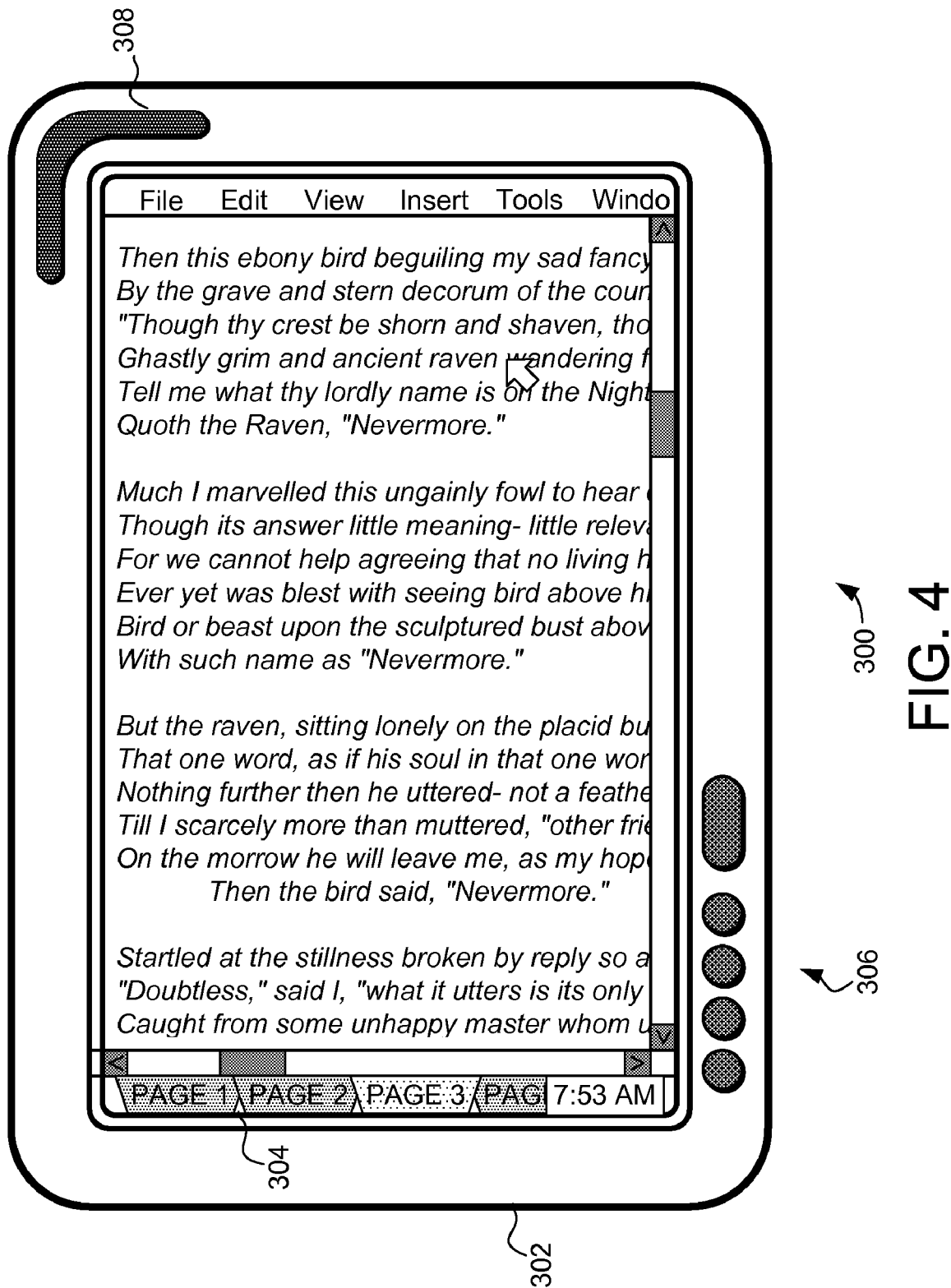

In FIG. 3, the computer device 300 is illustrated in a first display orientation, typically referred to as a "landscape" orientation. In this orientation, the natural up and down direction of the display is aligned in the narrow axis, while the natural left and right direction of the display is aligned with the wide axis. Turning now to FIG. 4, the computer device 300 is illustrated in a second, different display orientation. This display orientation is typically referred to as a "portrait" orientation. In this orientation, the up and down direction is aligned with wide axis, while the left and right direction is aligned with the narrow axis. The most straightforward way to reach the orientation shown in FIG. 4 from the orientation shown in FIG. 3 is clockwise rotation of 90 degrees. However, counterclockwise rotation of 270 degrees (or 270+any multiple of 360 degrees) and clockwise rotation of 90+ any multiple of 360 degrees will also reach the same result. Thus, an orientation change in a first way could comprise a clockwise orientation change or 90 degrees, or the equivalent counter clockwise orientation change of 270 degrees. Likewise, and orientation change in a second way could comprise a counter-clockwise orientation change of 90 degrees, or the equivalent clockwise orientation change of 270 degrees. The embodiments of the invention allow a user to easily switch from the landscape interface orientation illustrated in FIG. 3 to the portrait interface orientation illustrated in FIG. 4, and vice versa.

It should be noted that the different orientations of the display involve a change in direction for all major interface elements in the displayed device interface. Such a change in orientation should not be confused with a simple rotation of one element in the display interface, or even of a related group of elements within the displayed interface. Instead, a change in orientation of the display, as the phrase is used herein, refers to the collective change in direction of all major interface elements within the displayed device interface. This orientation change results in a change in direction for user interface elements while the relative position of the user interface elements within the display is largely unchanged. Such a change in orientation does not require that every element change their direction. For example, border images, individual circular icons, square switches or other interface elements for which no direction change is desired or needed are not required to change their direction for an effective change in orientation to occur. However, in most cases, the majority, if not all, of the interface elements will change in alignment direction during an orientation change in the display screen.

As described above, the proximity sensor device on computer device 300 is implemented to indicate an orientation change in a first way responsive to detected object motion along the sensing region 308 in a first direction, and is further implemented to indicate an orientation change in a second way responsive to detected object motion along the sensing region 308 in a second direction. Thus, a user of computer device 300 can cause orientation changes in different ways through the use of object motions in different directions along the sensing region 308 of the proximity sensor device.

Figure 6:
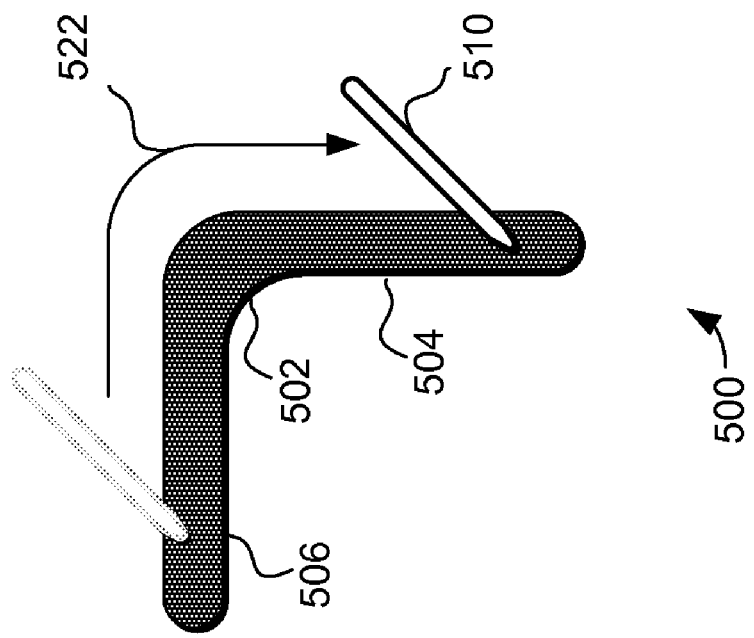
FIGS. 5-14 are top views of proximity sensor devices with various different sensing region implementations in accordance with the embodiments or the invention.
Figure 5:
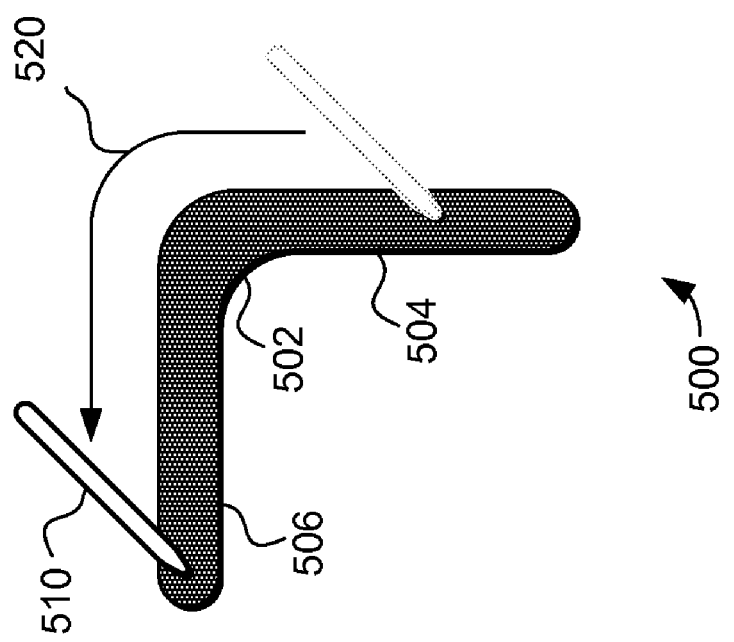

Turning now to FIGS. 5 and 6, examples of object motion along a sensing region in a first and second direction are illustrated. In FIGS. 5 and 6, the proximity sensor device 500 defines a sensing region 502. The sensing region 502 includes a first portion 504 and a second portion 506 that meet at a corner. The first portion 504 is arranged along a first axis while the second portion 506 is arranged along a second axis. In the illustrated embodiment, the first and second axes are substantially orthogonal, and the two sensing region portion together provide a sensing region with an overall L-shape. As much, the proximity sensor device 500 is particularly adaptable to be placed proximate a corner of a typical, rectilinear display screen with the first portion 504 parallel to a first side of the display screen, and the second portion 506 parallel to a second side of the display screen.

It should be noted that during operation the corner can be configured to function as part of the first portion 504, as part of the second portion 506, as neither the first portion 504 nor the second portion 506, or as both the first and second portions 504 and 506 in changing display orientation. A multitude of ways can be used to enable a dual-option corner. Time multiplexing is one option; for example, the corner can be part of the first portion 504 at certain times (e.g. from when object motion begins in a part of the sensing region 502 that is always the first portion 504 and continuing until the object motion moves away from the sensing region 502 or away from the corner, or vice versa). Many other options exist for ascertaining how the corner is treated, ranging from the simple to the complex, and include algorithms that use input or positional information history, applications of fuzzy logic, usage of heuristics to decipher user intent, and the like.

In the example illustrated in FIGS. 5 and 6, object motion along the sensing region 502 is illustrated through the motion of stylus 510. Specifically, FIG. 5 shows the motion of stylus 510 moving along the first portion 504 of the sensing region 502, turning the corner between the first portion 504 and the second portion 506, and then moving along the second portion 506 of the sensing region 502. Thus FIG. 5 shows one example of how a user can provide object motion along the sensing region 502 in a first direction 520 that is generally counter-clockwise. Conversely, FIG. 6 shows the motion of stylus 510 moving along the second portion 506 of the sensing region 502, turning the corner, and then moving along the first portion 506 of the sensing region 502. Thus, FIG. 6 shows one example of how a user can provide object motion along the sensing region 502 in a second direction 522 that is generally clockwise.

As described above, the sensor device 500 can be implemented to indicate an orientation change in a first way responsive to detected object motion along the sensing region 502 in the first direction 520, and is further implemented to indicate an orientation change in a second way responsive to detected object motion along the sensing region 502 in the second direction 522. As one example, the orientation change in a first way can comprise a counter-clockwise orientation change of 90 degrees. Likewise, and orientation change in the second way can comprise a clockwise orientation change of 90 degrees. As another example, the orientation change in a first way can comprise a counter-clockwise orientation change of 90 degrees, while the orientation change in the second way can comprise a counter-clockwise orientation change of 270 degrees.

In either case, the user of the electronic device can cause effective orientation changes in either of two different directions (clockwise and counter-clockwise) through the use of a single movement along the sensing region 502 simply by moving the object along the sensing region 502 in the desired direction. Thus, one input device can be used to facilitate orientation changes in different direction with two relatively simple and easy to perform gestures. Of course, some sensor devices can be implemented to support orientation change in only one direct. In these embodiments, the sensor device may be implemented to generate the same orientation change in response to reverse direction object motion. Alternatively, the sensor device may be implemented to generate no orientation change and instead generate no response or a different function in response to reverse direction object motion.

Figure 8:
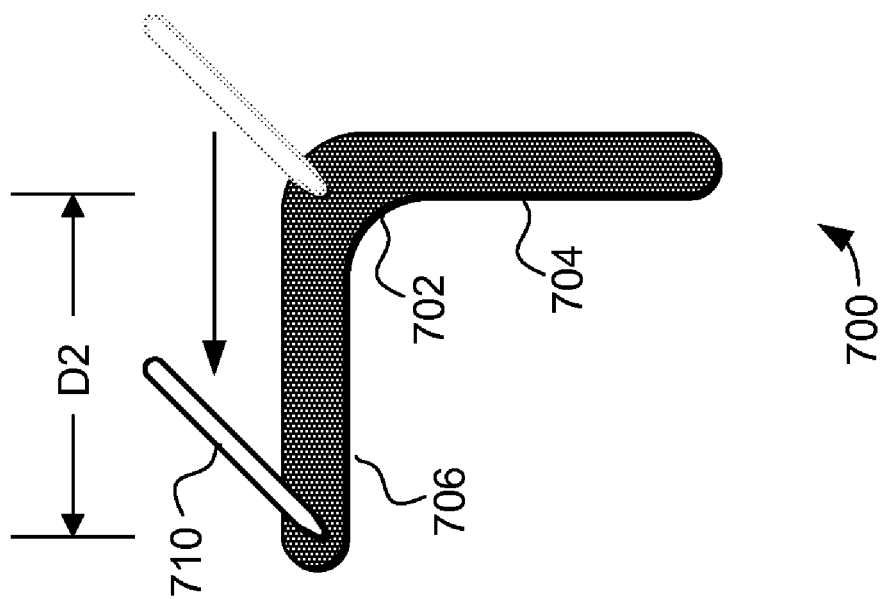
Figure 7:
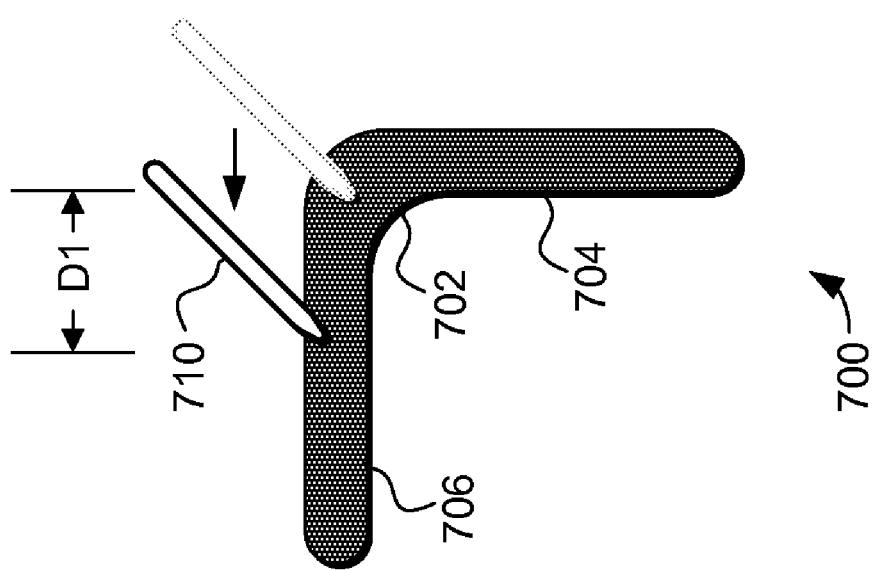

Furthermore, in some embodiments the proximity sensor device is adapted to facilitate orientation changes in different amounts based on the distance of object motion along the entire sensing region or along a specific portion of the sensing region. The distance of object motion may also be the entire distance traversed, or only the component parallel an axis (e.g. along a centerline of a section of the sensing region, or along the entire sensing region). Turning now to FIGS. 7 and 8, two examples of object motion along a sensing region 702 in a sensor device 700 are illustrated. In this example, the corner is treated as part of the first portion 704, and object motion along the sensing region 702 is illustrated through the motion of stylus 710. FIG. 7 shows the motion of stylus 710 moving a first distance D1 after turning the corner and moving into the second portion 706. Likewise, FIG. 8 shows the motion of stylus 710 moving a second distance D2 after turning the corner and moving into the second portion 706. Thus, FIGS. 7 and 8 show one example of how a user can provide object motion of two different distances along the sensing region 702.

In accordance with one embodiment, the proximity sensor device 700 is adapted to indicate an orientation change of a first amount responsive to detected object motion along the sensing region 702 in the first direction for a first distance, and is further adapted to indicate an orientation change of a second amount responsive to detected object motion along the sensing region 702 in the first direction for a second distance. In the illustrated embodiment, motion of D1 distance could correspond to an orientation change of 90 degrees, while motion of a D2 distance could correspond to an orientation change of 180 degrees. Of course, these are merely exemplary, and a large number of different variations could be provided. For example, the amount of orientation change could be set to step according to multiple preset distances corresponding to 45 or 90 degree steps of orientation changes. It should also be noted that the distance measured and used to determine the amount of orientation change can be the overall object motion measured along the entire sensing region 702, or the distance along a particular portion of the sensing region 702.

The different distances can be indicated to the user using a variety of techniques. For example, in some embodiments distance required for a set orientation change can be identified using visual cues, tactile/texture cues, or a combination thereof. These cues can be located in or proximate to the sensing region. This can allow a user to easily determine the amount of distance required to cause a particular orientation change, and thus can improve usability.

Furthermore, in such an implementation the proximity sensor device may be implemented to allow a user to pause the orientation change by stopping the object motion, and then continue the orientation change by resuming object motion along the sensing region 702. Additionally, after resuming object motion the orientation change can be implemented to continue at an increasing rate, continue at a decreasing rate, or with other variations. In other implementations the orientation change would not resume without repositioning the object and restarting the gesture. Finally, in other embodiments orientation changes could be implemented to continue, even after object motion ceases as long as object presence in the sensing region remains.

Additionally, the velocity, speed in a particular direction, or absolute speed of the object motion can be used to determine the rate or amount of orientation change. For example, object motion having a speed above a specified value can result in 180 degree orientation change, while object motion having a speed below that value can result in a 90 degree orientation change. Additionally, in some embodiments a user could easily reverse or undo an orientation change by immediately reversing the direction of object motion and continuing for a required distance (e.g. at least a minimum distance) in a different direction (e.g. in the opposite direction). This allows a user to correct for unwanted orientation changes, and for orientation changes of a greater amount than desired.

In all these various embodiments the proximity sensor device facilitates user control over the orientation of a displayed interface in the display screen with one user input device that responds to relatively simple gestures.

Figure 9:
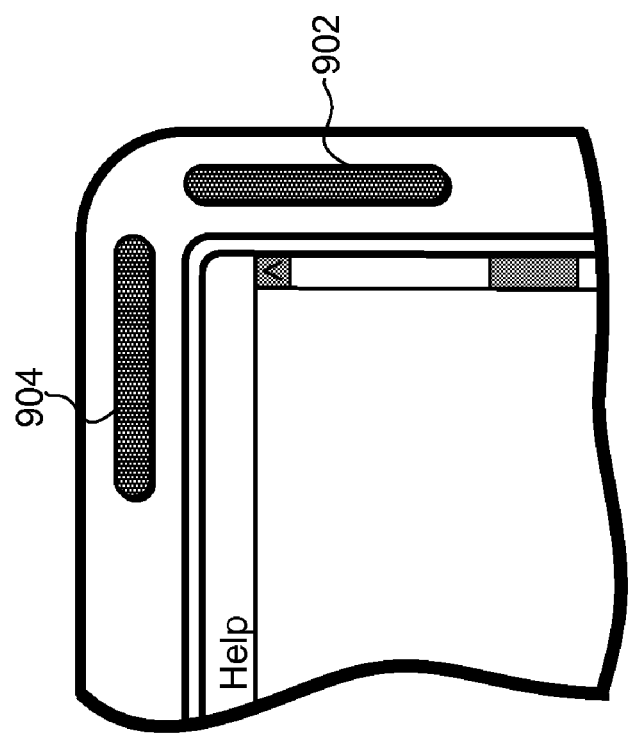

While the embodiments illustrated in FIGS. 3-8 are all comprised of proximity sensor devices with substantially L-shaped sensing regions demarked to user(s), it should be noted that a variety of different configurations and variations are possible. For example, FIG. 9 shows a portion of an electronic device 900 that includes a proximity sensor demarked with two distinct sensing region portions 902 and 904; sensing region portions 902 and 904 may actually be physically separate regions or merely demarked as such by a housing or some type of overlay. Such an embodiment may b desirable for applications that use the orientation change sensor in functions, such as vertical and horizontal scrolling, where the visual impact of the separate regions helps users comprehend and control the functions more intuitively. Such an embodiment may also be desirable in cases where uniform sensor layout is desirable, or where manufacturing or assembly constraints are such that linear sensing regions are more easily accommodated than ones involving linear and nonlinear regions; this latter case is more likely where the sensing region portions 902 and 904 are actually separate sensing regions.

Figure 10:
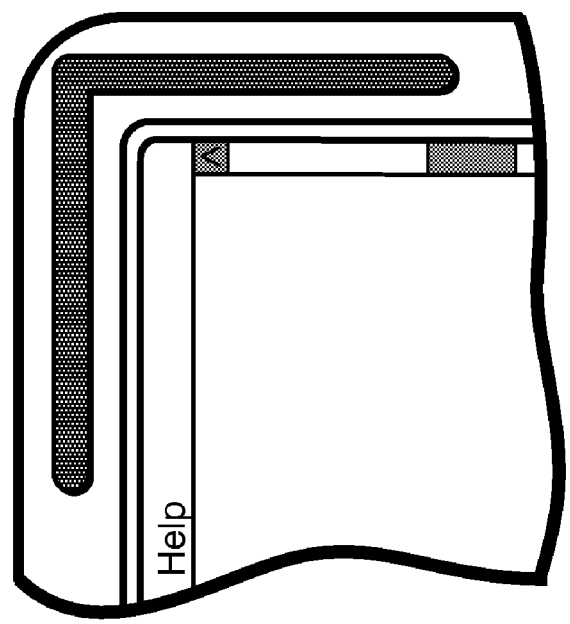

As another example, FIG. 10 shows a portion of an electronic device 1000 that includes a proximity sensor made up of two relatively longer and equivalently-sized sensing region portion. A wide variety of lengths, sizes, and shapes of the sensing region portions can be supported, and can be chosen and configured as appropriate to fit anticipated operating conditions, likely amounts of orientation change, other supported functions, and the like. It should be noted that in other embodiments one or more portions of the sensing region could extend across one or more entire sides. In addition, other embodiments of the sensing region could even include more than two sensing region portions. For example, the sensing region portions can form an "L" matched with a "reversed-L" when they are not connected, or a "C" or a "U" when they are. Other examples include shapes that are closer to "G" or "O," extending around most of if not the entire display. As another example, the sensing region portions can have rounded corners or angular ones, relatively constant width or varying width, linear sections or nonlinear sections, be convex or concave, have any number of edges, and the like. The number, widths, lengths, shapes, and configurations of the sensing region portion are quite flexible, and can be defined as appropriate to meet operating requirement. Additionally, The sensing region can comprise curved segments, and in some embodiments can include only curved segments with no straight segments. For example, the sensing regions can be implemented in the shape of a partial annulus.

Figure 11:
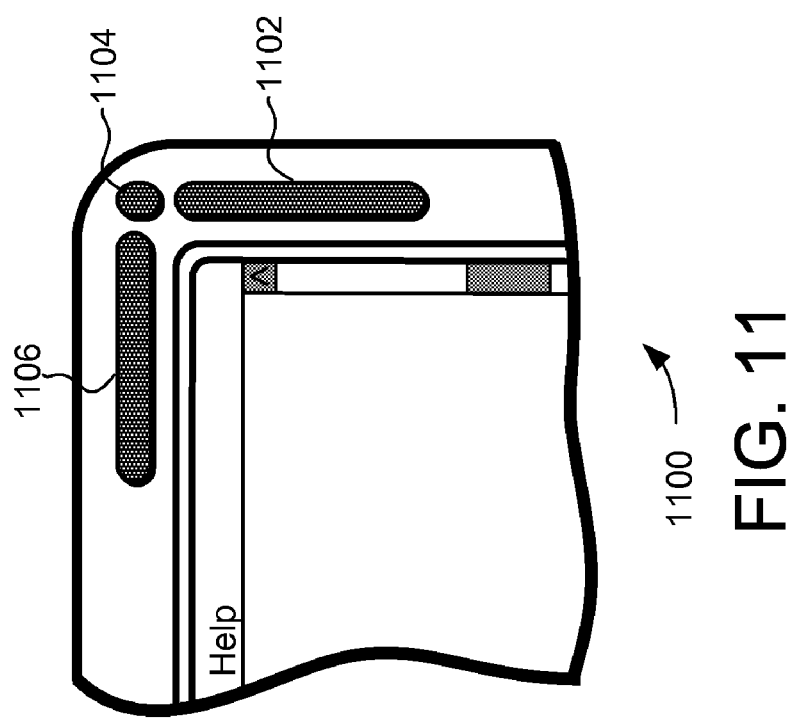

As yet another example, FIG. 11 shows a portion of an electronic device 1100 that includes a proximity sensor made up of three distinct sensing region portions 1102, 1104 and 1106. In this embodiment, the middle portion 1104 may provide additional functionality, such as key/button functionality, including non-alphanumeric input such as escape, page up or page down, and the like.

Figure 12:
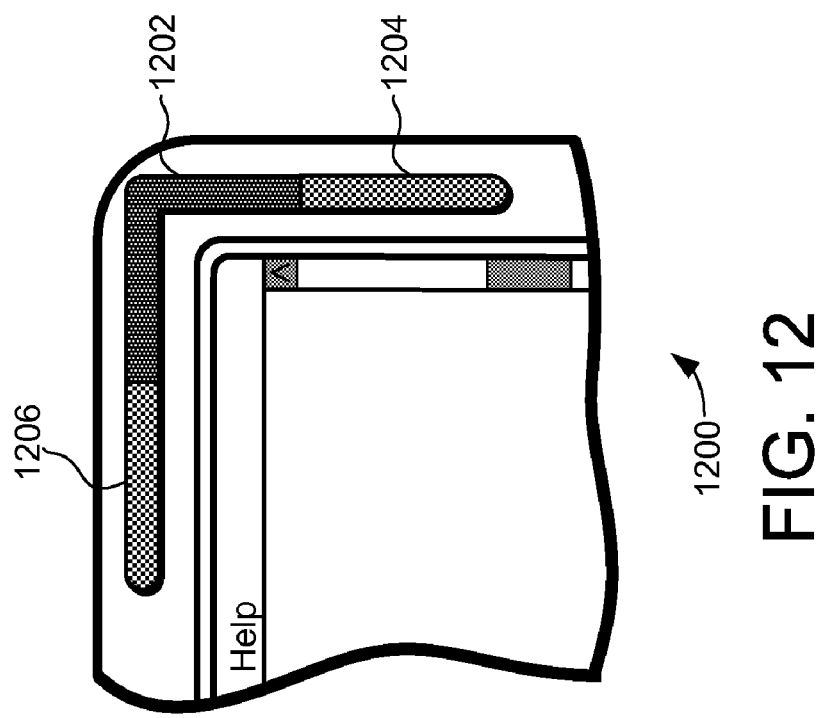

As yet another example, FIG. 12 shows a portion of an electronic device 1200 that includes a proximity sensor that includes regions dedicated to other functions. Specifically, the proximity sensor includes a corner portion 1202 and two end portions 1204 and 1206. The corner portion 1202 could be implemented to function as the L-shaped sensing regions illustrated in FIGS. 3-8, and can thus facilitate orientation changes in either direction in response to object motion along the corner portion 1206 of the sensing region. The end portions 1204 and 1206 can then be implemented to provide additional functionality. For example, portions 1204 and 1206 can be implemented to provide tap zones, cursor motion, scrolling, panning, dragging or some other type of interface navigation on the device 1200. Thus, the proximity sensor device would be able to provide a variety of different functions in addition to facilitating orientation changes for the display.

These various different portions of the sensor can be indicated to a user using a variety of techniques. For example, in some embodiments the center portion 1206 and end portions 1204 and 1206 are indentified using visual cues, tactile/texture cues, or a combination thereof. This can allow a user to easily recognize the various portions of the sensing region and thus can improve usability.

Figure 14:
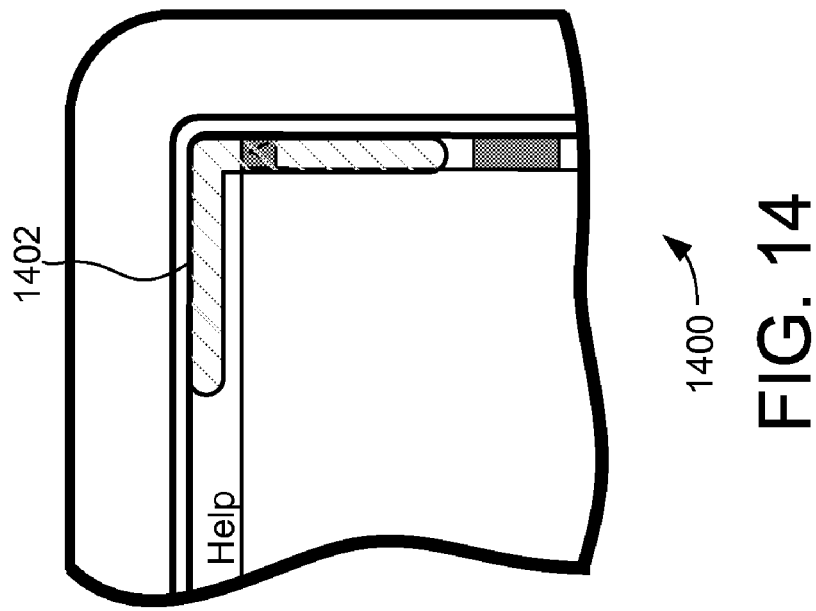
Figure 13:
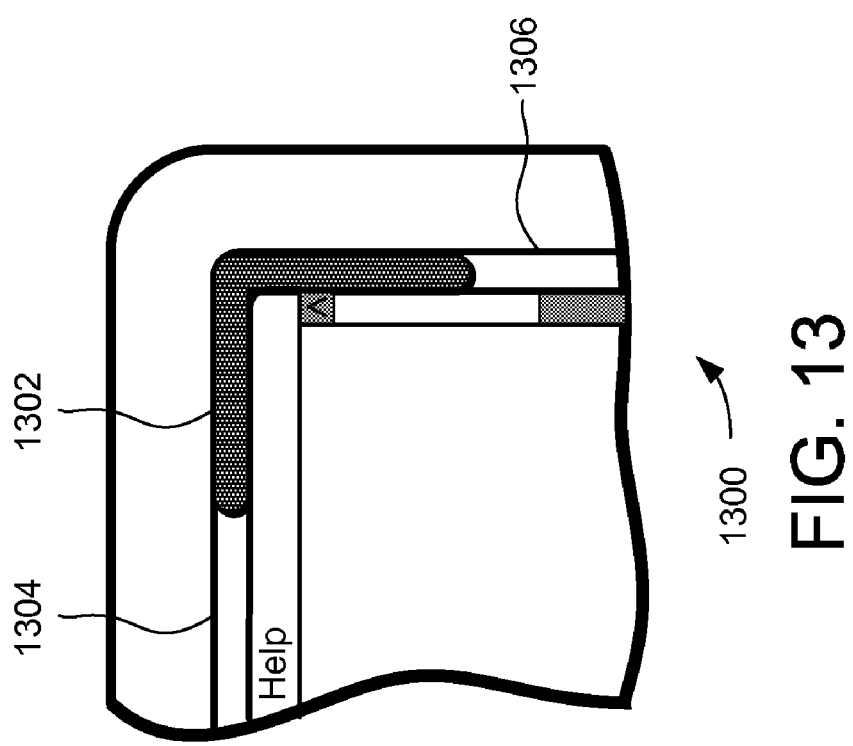

In the previously illustrated embodiments, the proximity sensor devices have defined a sensing region that what proximate the corner and adjacent the edge(s) of the display screen. In other embodiments, the proximity sensor device can be implemented such that the sensing region overlaps one or more edge portions of the display screen. Turning now to FIG. 13, a portion of electronic device 1300 is illustrated that includes a proximity sensor with a sensing region 1302 that overlaps an edge portion of the display screen 1306. In this embodiment the proximity sensor would be implemented with a technology that is compatible with the overlapping display screen. For example, the proximity sensor can implemented with a sensor technology that allows images(s) on the display screen to be viewed through the sensing region. This may be accomplished by any appropriate technology, such as by incorporating proximity sensing technology that disposes transparent or semi-transparent portions overlapping the display screen. One example of such a suitable proximity sensor using capacitive technology is described at U.S. Pat. No. 7,030,860, issued Apr. 18, 2006, and assigned to Synaptics Incorporated. Other examples include touch sensors using resistive sensing technology or other capacitive implementations. This may also be accomplished by using proximity sensing technology utilizing opaque sensor electrodes and clear substrates, where the opaque sensor electrodes are small enough as to allow image(s) to be viewed through the clear substrate where there are no electrodes. This may also be accomplished by using proximity sensing technology that places sensing elements outside of the sensing region that overlap the display screen. Three examples include SAW (surface acoustic wave), optical, and inductive implementations. In this implementation the boundaries of the sensing region 1302 can be indicated by any number and combination of passive or active images generated by the underlying display, and thus provide good user indication of how an orientation change can be easily performed. The boundaries of the sensing region 1302 can also be demarked by physical indication above or bordering the display screen, such as via passive visual indications or active illumination components such as LEDs. Where the boundaries of the sensing region 1302 are indicated by images on the underlying display, the sensing region 1302 can also be made dynamic and moved to different portions of the display screen as appropriate for the current orientation of the display screen as well as any other images displayed on the display screen. In some instances, the sensing region 1302 can even be moved to a central portion of the display screen, and away from any edges of the display screen. Turning now for FIG. 14, in another variation, the sensing region 1402 can overlap the displayed image on the display screen without the addition of a border 1304 as shown in FIG. 13. With this approach, the sensing region and function can be accommodated without needing to reduce the size of the displayed image, increasing the size of the display screen, or both. For example, the sensing region 1402 can be located along the perimeter of the displayed image, overlapping with menu bar(s), window border(s), or whatever is shown underneath the overlapping with menu bar(s), window border(s), or whatever is shown underneath the overlapping sensing region. In this illustrated embodiment the sensing region is identified to a user by a partially-transparent image on the display screen, allowing the underlying interface elements to remain visible to the user. Other displayed images, varying from completely opaque to completely transparent, can also be used. For example, the images can include any combinations of outlines along the border of the sensing region, visual cues inside the sensing region, or visual cues outside of the sensing region. Indications distinct from the display can also be used, including markings on the device outside of the display screen (e.g. graphics on a housing). There may also be no indication at all, and users can just understand that particular areas are for display orientation adjustment. Alternatively, the sensing region and the corresponding image(s) or indication(s) (if any) can be located elsewhere on the display screen, and along only a portion of the perimeter, along multiple portions of the perimeter, or along the entire perimeter. Further, the sensing regions can overlap only the display screen, only overlap the electronic device outside of the display screen, or overlap both the display screen and portions of the electronic device outside of the display screen.

It should be noted that while the various embodiments illustrated in FIGS. 9-14 have shown proximity sensor devices implemented with sensor regions near or overlapping the display screen, that other implementations are also possible. For example, the sensing region can be implemented in a corner away from the display screen, on the backside opposite the display screen, or in any other location. Several different techniques can be used to improve the usability of proximity sensor devices to indicate orientation changes in accordance with embodiments of the invention. For example, in some implementations it will be desirable to not cause orientation changes in response to signals representing very small or sudden amounts of sensed object motion. Small amounts of sensed object motion vary from embodiment to embodiment, they are relatively small compared to the expected amounts of object motion given the sensing region design, the sensing technology, noise in the operating environment, and the like. Sudden amounts of sensed object motion also vary from embodiment to embodiment, they occur in shorter spans of time than expected given the sensing region design, the sensing technology, noise in the operating environment, and the like. One or more thresholds can be used to quality input as "small" and "sudden," and any number or them can be defined at the time of design, manufacture, or dynamically during operation. Defining at design may be desirable if sensor signals are predictable and will vary very little. Defining at manufacture may be desirable if sensor signal difference are high due to part-to-part variation, and are low as users and operating conditions change. Defining dynamically during user may be desirable if the sensor signals are anticipated to very significantly over users, conditions, and time. Criteria can also be combined or enhanced. For example, time criteria can be imposed along with the amount of object motion criteria such that the amount of object motion gauged as "small" or "not small" is the amount of object motion over a defined period of time. As another example, a speed of the object motion can be coupled with a time criterion to aid in categorizing "sudden" or "not sudden" object motion.

Small amounts of sensed object motion can inadvertently result from attempts by the user to pause and stop moving in the sensing region. In these cases, small amounts of motion caused by bodily tremors or shaking in the environment could be interpreted as intended object motion. Small amounts of sensed object motion can also result from attempts by the user to provide some other type of input if the sensing region is configured to support other types of input. In these cases the small amounts of motion should be processed to cause events other than orientation change. In addition, a user may reduce or stop paying attention to object motion, and accidentally cause drift of the object motion. Further, there may also be cases of accidental input from the user accidentally brushing against the sensing region (these are likely to result in sudden amounts of sensed object motion, large or small). Likewise, electronic noise from sources such as power supply(s), fluorescent lights, cell phones and other EMI sources, etc. can cause spurious, incorrect signals hinting at object motion that do not exist. As another example, in some implementations it will be desirable to not indicate results responsive to signals representing slow gestures, i.e., gestures that do not comprise a predetermined amount of motion within a specified timeframe. In all these cases it can be desirable to not indicate results to cause orientation change responsive to these signals associated with small or sudden amounts of sensed object motion to avoid causing inadvertent orientation changes when no such change is intended by the user.

One way to address this issue is with the use of filters, such as with the use of threshold values as discussed earlier, an by gauging if the object motion is beyond one or more threshold levels. Thresholds may be maximum or minimum bounds, such that object motion may be "beyond" a maximum threshold when it is above the threshold level and "beyond" a minimum threshold when it is below the threshold level. In some cases, object motion at a threshold can also be categorized as meeting the criterion of being "beyond" the threshold. For example, by comparing the sensed object motion to a threshold, the system can ignore sensed levels of object motion that are below the threshold and not cause orientation changes in response to those object motions. In this case, the threshold can be set to filter out object motion less than what is likely to be indicative of intended orientation change, and the proximity sensor device will not consider amounts of sensed object motion below that threshold to be indicative of an orientation change. Alternatively, the system can ignore sensed levels of object motion that are above a threshold and not generate an orientation change. In this alternate case, the threshold can be set to filter out object combination motion greater than what is likely to be indicative of intended input, and the proximity sensor device will not consider amounts of sense object motion above the threshold to be indicative of object motion. A variety of thresholds can be used, separately or in combination. For example, the system can require that the object motion travel a minimum distance in the sensing region before responding with results in display orientation change, but accept object motion traveling less than that minimum distance threshold as input intended to trigger other functions, or no input at all (ignorable input). The distance can also be the total distance traversed, distance from a certain point or line, or distance parallel to one or more axes.

It should be noted that while object motion below the distance threshold would not then generate an orientation change, it could still be used to trigger other input. Further constraints can be imposed, such as to require that a minimum distance or a maximum distance be traveled within a predetermined amount of time. The threshold may also alternatively be on another characteristic of the object motion, such as requiring that the speed of the object motion be beyond a certain threshold and/or below a particular threshold before generating an indication of a result. Thresholds may also be combined, such that an object motion must travel a minimum distance, within a certain amount of time, and reach at least a minimum speed, before indications of results will be provided. Another combination of thresholds can require that an object motion must travel no more than a maximum distance, during a certain amount of time, and not pass (exceed in this case) a maximum speed, such that the system will begin or continue indications of results.

The exact values of these thresholds vary with a myriad of factors, such as details of the sensing technology, user interface design, and operating conditions. The threshold values may also differ with direction/manners of results, which result is selected, and user preferences. To accommodate this, the threshold values can be made adjustable, such as to change the value in response to determined noisiness of the environment, prior history of typical user input speeds and distances, which result is currently selected, which direction/manner of adjustment is current active, which application(s) are active, or the like. In such a system the adjustments can be user selectable, or made automatic to respond to different operating conditions and/or modes.

The present invention thus provides a proximity sensor device and method that facilitates orientation changes in displays. The proximity sensor device and method provide a user with the ability to indicate an orientation change in a display using the sensing region of a proximity sensor device as a user interface. Thus, a user can cause orientation changes in different ways through the user of object motions in different direction along the sensing region. This provides increased usability and flexibility, and allows a user to easily cause different ways of orientation change without requiring multiple buttons, steps or gestures by the user.

The embodiments and examples set forth herein where presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A proximity sensor device for an electronic device having a display screen, the proximity sensor device comprising:
   a proximity sensor, the proximity sensor adapted to be adjacent to the display screen of the electronic device, the proximity sensor adapted to detect object motion along a sensing region, wherein the sensing region has an angular shape with an angle; and
   a processor, the processor coupled to the proximity sensor, the processor adapted to indicate an orientation change for the display screen in a first way responsive to detected single object motion traversing the angle in a clockwise manner, the processor further adapted to indicate an orientation change for the display screen in a second way responsive to detected single object motion traversing the angle in a counter-clockwise manner.

2. The proximity sensor device of claim 1 wherein the orientation change in the first way comprises an orientation change in a clockwise direction and wherein the orientation change in the second way comprises an orientation change in a counter-clockwise direction.

3. The proximity sensor device of claim 1 wherein the processor is adapted to indicate an orientation change in the display screen in the first way responsive to detected single object motion traversing the angle in the clockwise manner by indicating an orientation change of a first amount responsive to detected single object motion for a first distance, and by indicating an orientation change of a second amount different than the first amount responsive to detected single object motion for a second distance different from the first distance.

4. The proximity sensor device of claim 3 wherein the first amount comprises 90 degrees and the second amount comprises 180 degrees.

5. The proximity sensor device of claim 1 wherein the sensing region overlaps an edge portion of a display region on the display screen.

6. The proximity sensor device of claim 1 wherein the sensing region is adjacent an edge of the display screen.

7. The proximity sensor device of claim 1 wherein the proximity sensor comprises a capacitive sensor.

8. A proximity sensor device for a portable computing device having a display screen, the proximity sensor device comprising:
   a capacitive proximity sensor, the capacitive proximity sensor adapted to detect object motion along the sensing region, the sensing region including a first sensing region portion, the first sensing region portion having a first axis parallel a first side of the display screen, the sensing region further including a second sensing region portion, the second sensing region portion having a second axis parallel a second side of the display screen, wherein the first sensing region portion and the second sensing region portion together define an L-shape proximate a corner of the display screen, and wherein a vector normal to a touch surface associated with the sensing region is substantially parallel to a vector normal to the display screen; and
   a processor, the processor coupled to the proximity sensor, the processor adapted to indicate an orientation change for the display screen in a clockwise direction responsive to detected single object motion in a first direction along the L-shaped sensing region, the processor further adapted to indicate an orientation change for the display screen in a counter-clockwise direction responsive to detected single object motion in a second direction along the L-shaped sensing region.

9. The proximity sensor device of claim 8 herein the processor is further adapted to:
   indicate an orientation change for the display screen in the clockwise direction responsive to detected single object motion in the first direction along the L-shaped sensing region by indicating an orientation change of a 90 degrees clockwise responsive to detected single object motion in the first direction along the L-shaped sensing region for a first distance, and to indicate an orientation change of a 180 degrees clockwise responsive to detected single object motion in the first direction along the L-shaped sensing region for a second distance different from the first distance; and
   indicate an orientation change for the display screen in the counter-clockwise direction responsive to detected single object motion in the second direction along the L-shaped sensing region by indicating an orientation change of a 90 degrees counter-clockwise responsive to detected single object motion in the second direction along the L-shaped sensing region for a third distance, and to indicate an orientation change of a 180 degrees counter-clockwise responsive to detected single object motion in the second direction along the L-shaped sensing region for a fourth distance different from the third distance.

10. A method of indicating an orientation change in a display screen of an electronic device, the method comprising:
    detecting single object motion along a sensing region of a proximity sensor wherein the sensing region has an angular shape with an angle;
    determining a direction of detected single object motion traversing the angle; and
    indicating an orientation change in the display screen in a first way if the direction of detected single object motion traversing the angle is traversing the angle in a clockwise manner; and
    indicating an orientation change in the display screen in a second way if the direction of detected single object traversing the angle is traversing the angle in a counter-clockwise manner.

11. The method of claim 10 wherein the angular shape with an angle comprises an L-shape.

12. The method of claim 10 wherein the orientation change in the first way comprises an orientation change in a clockwise direction and wherein the orientation change in the second way comprises an orientation change in a counter-clockwise direction.

13. The method of claim 10 further comprising the step of determining a distance of motion along the sensing region, and wherein the step of indicating an orientation change in the display screen in a first way if the direction of detected motion traversing the angle is traversing the angle in a clockwise manner comprises indicating an orientation change of a first amount if the determined distance exceeds a first distance and indicating an orientation change of a second amount different than the first amount if the determined distance exceeds a second distance greater than the first distance.

14. The method of claim 13 wherein the first amount comprises 90 degrees and the second amount comprises 180 degrees.

15. The method of claim 10 further comprising the step of determining if the detected single object motion exceeds a minimum amount of motion within a specified time frame.

16. The method of claim 10 further comprising the steps of:
determining if the detected single object motion ceases;
determining if the detected single object motion resumes; and
again indicating an orientation change in the display screen in a first way if the direction of resumed single detected motion comprises motion in a first direction and again indicating an orientation change in the display screen in the second way if the direction of resumed single detected motion comprises motion in a second direction.

17. A program product comprising:
a proximity sensor program, the proximity sensor program adapted to receive motion data from a proximity sensor adjacent to a display screen in an electronic device, the motion data generated responsive to detected single object motion traversing an angle along a sensing region, the proximity sensor program further adapted to indicate an orientation change for the display screen in a first way responsive to detected single object motion traversing the angle in a clockwise manner, the proximity sensor program further adapted to indicate an orientation change for the display screen in a second way responsive to detected single object motion traversing the angle in a counter-clockwise manner; and
non-transitory computer-readable media bearing said proximity sensor program.

18. The program product of claim 17 wherein the orientation change in the first way comprises an orientation change in a clockwise direction and wherein the orientation change in the second way comprises an orientation change in a counter-clockwise direction.

19. The program product of claim 17 wherein the proximity sensing program is adapted to indicate an orientation change in the display screen in the first way responsive to detected single object motion traversing the angle in a clockwise manner by indicating an orientation change of a first amount responsive to detected single object motion for a first distance, and to indicate an orientation change of a second amount different than the first amount responsive to detected single object motion for a second distance different from the first distance.

20. The program product of claim 19 wherein the first amount comprises 90 degrees and the second amount comprises 180 degrees.

* * * * *